Patented Oct. 14, 1952

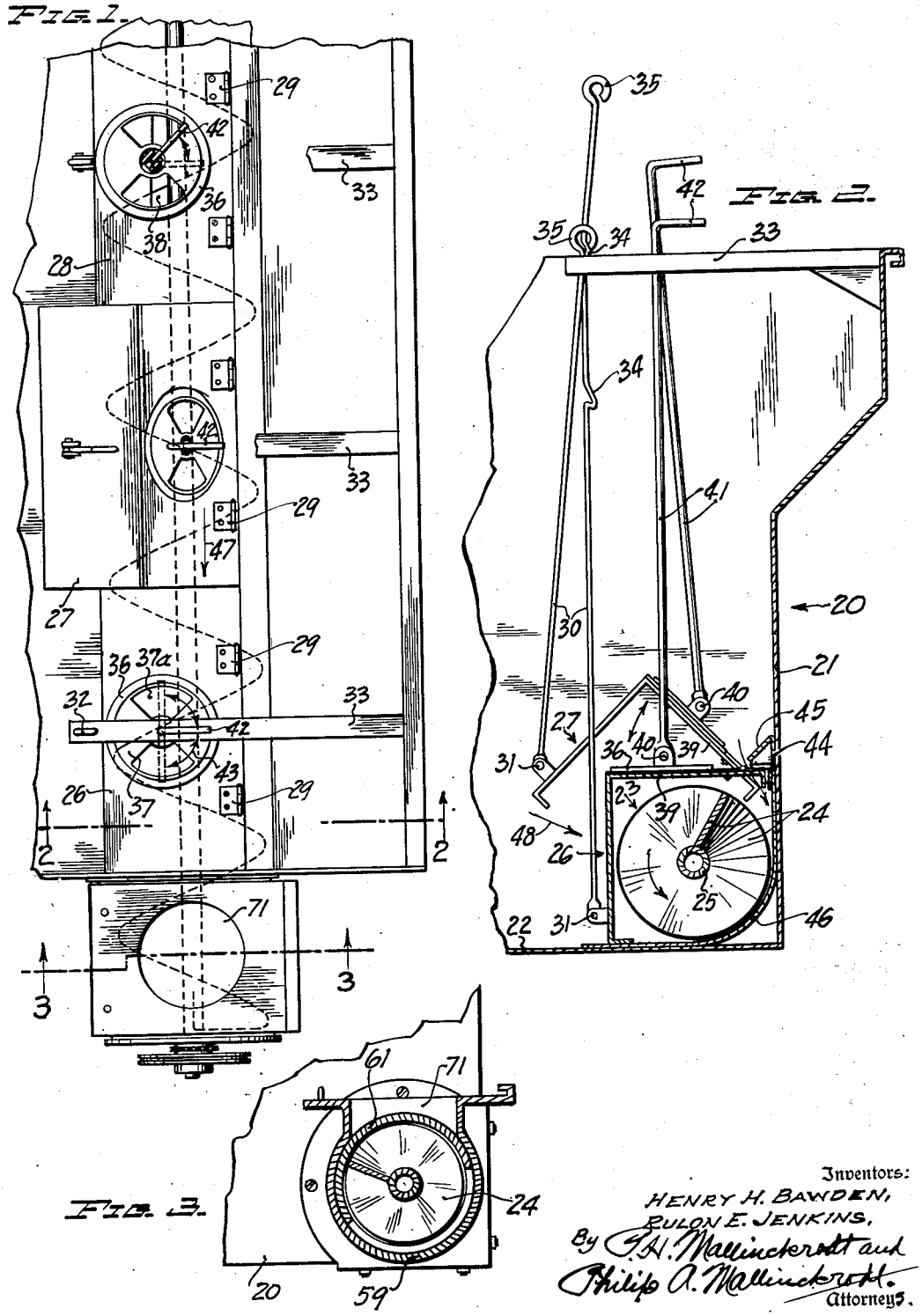

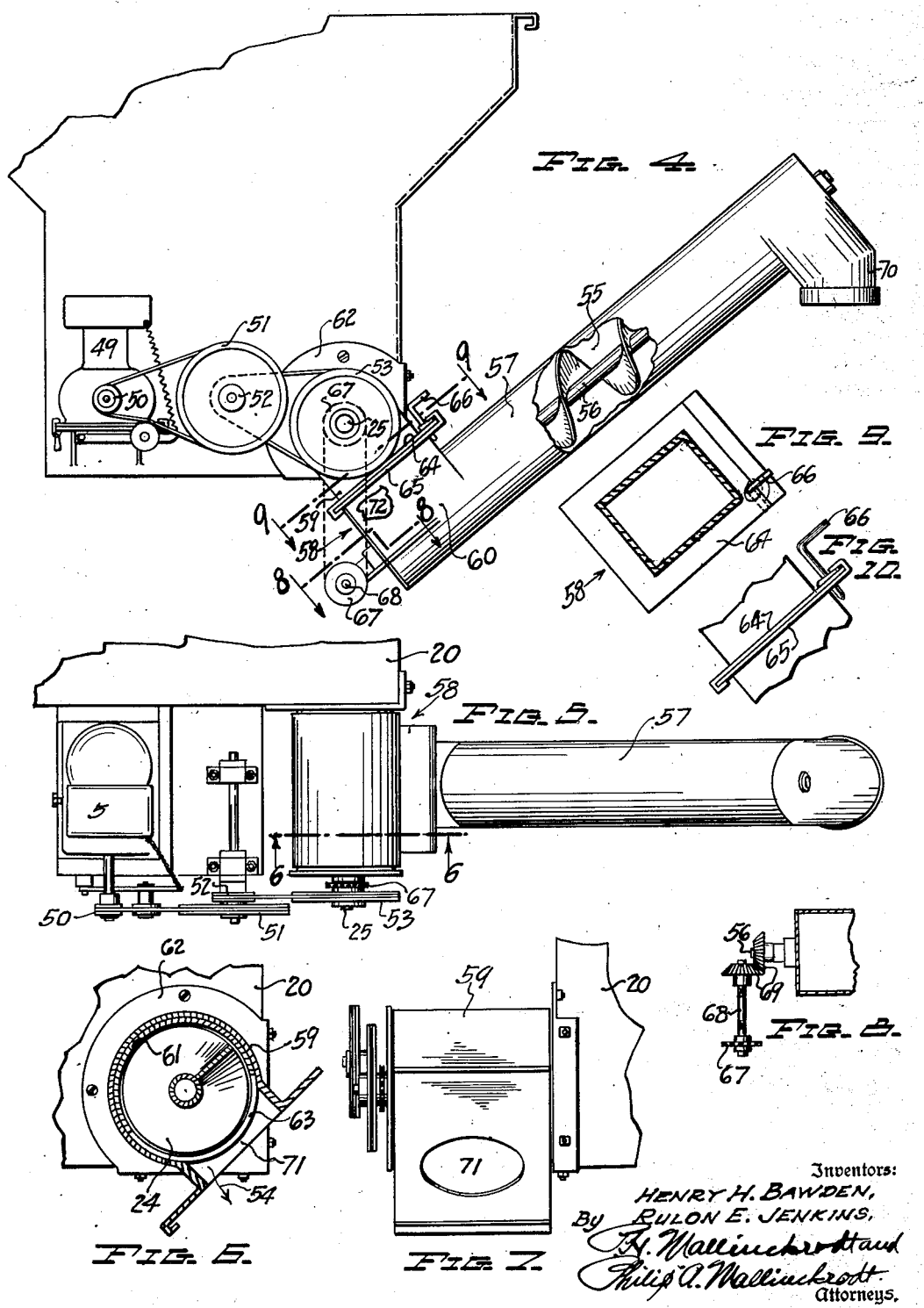

2,613,799

UNITED STATES PATENT OFFICE 2,613,799

SYSTEM AND APPARATUS FOR HANDLING GRAIN

Henry H. Bawden and Rulon E. Jenkins, Granger, Utah

Application June 17, 1947, Serial No. 755,206

9 Claims. (Cl. 198—64)

This invention relates to a system and to an apparatus for handling grain.

Among the principal objects of the invention are to provide:

(a) A system whereby the handling and transportation of grain is expedited;

(b) Apparatus that is simple, sturdy, convenient and serviceable in relatively small units, but not limited necessarily;

(c) Apparatus that can be operated to advantage by unskilled farm labor;

(d) Apparatus that is readily maneuverable according to varying, operative situations met with in practice;

(e) Apparatus that is relatively economical in first cost as well as in service.

Modern methods of growing and harvesting grain, and particularly wheat, include mechanization to a considerable extent. However, prior methods of handling grain between field and granary, or between granary and railroad cars or trucks, especially among the smaller growers, are still carried on in rather primitive ways involving considerable manual labor.

According to the invention, in order to conserve space, it is desirable that grain containers such as storage bins and the bodies of transportation units, for example, automotive trucks, have substantially flat bottoms that are intersected by substantially vertical walls. Since these usually consist of welded metal plates, emptying the containers by strictly gravity means is not practicable.

The system of the invention therefore contemplates moving the grain in a stream along the dihedral angle defined between the bottom and intersecting wall of a grain confining structure, by means of a screw conveyor that runs in a dihedral angular channel instead of a usual trough. Into this stream the grain is caused to flow from the one side that in operation is entirely open, when so desired.

The mechanism of the invention comprises advantageously a helical worm that is rotatably disposed in an enclosing housing through which the flow of grain is controlled selectively as desired, until a certain point of depletion of the contents of the container has been reached. Then the housing is raised, preferably in longitudinal sections, so as to establish an open side through which the remaining grain is swept sidewisely into the rotating worm. The lower part of the worm rotates in the direction away from the open side and thereby becomes instrumental in drawing the approaching sweep of grain into the general stream.

In the accompanying drawings which illustrate an effective embodiment of the invention:

Fig. 1 represents a fragmentary plan;

Fig. 2, a fragmentary vertical section taken on the line 2—2 in Fig. 1;

Fig. 3, a vertical section taken on the line 3—3 in Fig. 1;

Fig. 4, an end elevation, portions being broken away for convenience, including a certain attachment which does not appear in Figs. 1 and 2;

Fig. 5, a fragmentary plan corresponding to Fig. 4;

Fig. 6, a section taken on the line 6—6 in Fig. 5, this section being similar to that of Fig. 3, but showing a certain part in an alternative position, portions in the background being omitted;

Fig. 7, a fragmentary side elevation;

Fig. 8, a fragmentary plan partially in section, taken on the line 8—8 in Fig. 4;

Fig. 9, a section taken on the line 9—9 in Fig. 4; and,

Fig. 10, a fragmentary elevation corresponding to Fig. 9, both figures being drawn to an enlarged scale.

Referring to the drawing, the numeral 20 denotes a container for grain, notably wheat, this container being in the form of a truck body. This container has a substantially vertical wall 21 and a substantially horizontal bottom 22, the body being constructed preferably of steel plates welded together to make grain-tight joints. Extending lengthwise thereof is a screw conveyor 23 having the flight 24 mounted on a rotatable shaft 25 in any usual manner.

The conveyor screw 23 is enclosed in a housing which includes longitudinally disposed sections 26, 27 and 28, these sections having advantageously a right angular configuration, as indicated in Fig. 2. Each of the sections 26, 27 and 28 is hinged as at 29, so as to be swung about the hinge axis up or down between extremes, as indicated by the double-pointed arrow in Fig. 2. Manipulation of the housing sections is accomplished in this instance by means of upwardly extending rods 30 that are pivoted to the respective housing sections at 31, the rods passing through openings 32 in brackets 33. Each of the rods 30 has a ratchet-like kink 34, which passes through the corresponding slot 32 in the respective section and rests on the bracket 33, lifting of each rod being manually accomplished by taking hold of a respective eyelet 35.

When the container 20 is to be filled with grain, the housing sections are all closed down, which prevents any grain from flowing into the conveyor compartment. In order to selectively control the flow of grain into the housing sections, valves 36 are provided, these being mounted on top of the respective housing sections. The valves 36 include preferably circular plates 37 having apertures 37a, which in the open position come more or less into registry with similar apertures 38, the latter being formed in the walls 39. Each of the valves 36 has connected thereto, in this instance pivotally at 40, a rod 41. The rods 41 pass through openings in brackets 33 and are provided with the respective handles 42, by means of which the corresponding valves are rotated, as indicated by the double-pointed arrows 43 in Fig. 1.

The hinges 29 are mounted on an angle bracket 44 that preferably extends longitudinally of the container, which bracket, however, if left uncovered, would have the objection of retaining a residue of grain. Therefore, a deflecting lip 45 is placed above the bracket 44, lip 45 in this instance, conveniently forming part of an elongate, substantially quarter-circular plate 46, which may be said to form quarter-turn guide means which is substantially concentric with the screw conveyor.

Assuming now that the housing sections are all in the down position, the valves 36 being closed, the container is ready to be filled with grain. In this instance, the container 20, as previously stated, forms the body of an automotive truck (not shown) that plies, for example, back and forth between the field where the grain is harvested and the place of deposit, such as a grain bin (not shown). When the container arrives at its destination, the emptying operation of the container 20 is conducted as follows.

Assuming that the conveyor screw 23 is being rotated, in this instance counterclockwise, so that the lower periphery of the screw moves towards the right, in the direction of the plate 46, the operator, by means of the proper handles 42 and rod 41 slowly rotates the corresponding valve 36 as desired, thereby selectively causing limited quantities of grain to descend by gravity into the conveyor screw 23. In this instance it is assumed that counterclockwise rotation of the conveyor screw moves the grain in the direction of the arrow 47 in Fig. 1. The operator continues to manipulate the particular rod 41 until the grain above a particular section is removed sufficiently for that section to be raised by means of its rod 30, after which a certain amount of grain runs sidewisely into the conveyor screw as indicated by the arrow 48. As the angle of repose of the grain is approached, the operator sweeps the grain, manually, for instance by means of a broom, into the conveyor screw until finally the bottom surface 22 is reached and the container is completely emptied.

Power for rotating the conveyor screw may be furnished from an internal combustion engine 49 mounted outside the container, the power of the engine being transmitted to the conveyor shaft 25 by means of any suitable reduction gearing. In this instance the reduction is effected by means of engine pulley 50, countershaft pulley 51, countershaft pulley 52, and conveyor pulley 53. If it is desired not to elevate the grain so as to flow into another container, the conveyor may discharge the same at the end 54 of its run.

If the grain is to be discharged at a higher level, for instance into a bin (not shown), an extension conveyor is provided, comprising for example, a conveyor scrow 55 having the shaft 56 rotatably mounted in a tubular boom 57. This boom is detachably connected at the discharge end of the conveyor screw 23 by means of a connection or transition box 58, preferably made up of the two parts 59 and 60. The part 59 is rotatably mounted on a cylindrical shell 61 that is attached to the container 20 by means of an integral flange 62. The part 60 forms a substantially rigid part of the boom 57, so that the transition box 58 and the boom 57 constitute a unit that is rotatable about the axis of the conveyor screw 23.

The shell 61 is open at 63 so that communication between the shell 61 and the part 60 is provided, it being observed that the opening 63 is of sufficient angular extent that the communication is not interfered with in any of the operating positions of the boom, that is to say, from the horizontal position to an angular position such as is shown in Fig. 4. At the same time, the shell 61 is sufficiently extensive angularly, that in the position of Fig. 3, it closes off the communicating passage 71 for the purpose of sealing the container against the entrance of rats, mice or other vermin, as well as prevents leakage of grain. The detachable connection between the parts 59 and 60 of the transition box 58 is effected in this instance by means of the interlocking respective flange portions 64 and 65, these portions being held in position by a key 66. Passage 72 registers with 71 and leads into 60.

The conveyor screw 55 is driven from the conveyor shaft 25 by means of the respective sprockets 67, one of which is mounted on the shaft 25 and the other on the short countershaft 68. Motion from the countershaft 68 is transmitted to the conveyor shaft 56 by the miter gears 69. The assemblage is properly arranged so that the grain transported by the conveyor screw 23 flows through the transition box 58 and is picked up by the conveyor screw 55 and is discharged through the terminal sleeve 70 at suitably varying elevations. Since the boom 57 oscillates about the axis of shaft 25, the sprockets 67 maintain a uniform center to center distance in any position of the boom.

While the invention is herein illustrated in connection with an open container constituting a vehicle body, its use in connection with closed grain bins and the like is quite obvious.

Since the structures with which the apparatus of the invention is used are mostly located out-of-doors, the fact that the boom 57 need only to be pushed up into a substantially vertical position to render the apparatus proof against vermin, adds to its utility.

The quarter circular plate 46 is substantially tangent to both the bottom 22 and the side wall 21 so as to form a smooth fillet in the angular space between the bottom and the wall, and further, so as to act as a longitudinal guide means to direct the moving grain towards the conveyor discharge terminal. Because of the helix-angle of the conveyor screw, the helicoidal surface of the rotating flight 24 exerts a force component in two directions upon the grain particles coming through the open side when housing sections 26, 27 and 28 are raised. One of said force components is active to propel the grain particles longitudinally along the quarter-turn surface 46 as a guide, but at the same time the other force component is active to push the in-drawn grain particles a certain distance upward on the surface 46, thereby tending to keep the conveyor at least partly filled with grain.

The shell 61 of part 62, being fixed outside the container, brings the cooperatively disposed part 60 alone, or with the boom 57, into easy reach of the operator, it being particularly convenient for the operator to swing the boom into various working positions as well as to swing it up so as to close off the opening 71 when the mechanism is not running, or when the container is used merely for grain storage.

Whereas this invention is here illustrated and described with respect to certain preferred forms thereof, it should be understood that various changes may be made therein and various other forms may be constructed by those skilled in the art without departing from the scope of the following claims.

What is claimed is:

1. Grain handling apparatus comprising a container having a tightly closed body that includes a substantially horizontal bottom and a substantially vertical wall intersecting said bottom; screw conveyor means rotatably disposed within the angular configuration between said bottom and said vertical wall; quarter-turn guide means substantially concentric with said screw conveyor means; said guide means being approximately tangent to both said bottom and said side walls and having a forwardly extending plane surface which coincides with the surface of said horizontal bottom; and means operative to rotate said conveyor means wherein is included sectional housing means each section of which consists of a normally vertical plate in front of said screw conveyor; a normally horizontal plate extending over the top of the conveyor so as to join the vertical plate at least partially enclosing said screw conveyor means; hinge means connecting said sectional housing means to said wall along the edge thereof opposite the joint between the two said plates; and means for raising and lowering said sectional housing means.

2. Grain handling apparatus comprising a grain container; a screw conveyor extending longitudinally along the inside of said container; a cylindrical shell substantially concentric with said screw conveyor in proximity to the discharge terminus thereof and having a circumferential grain discharge opening, said shell being fixed outside said container; a transition-box part having a neck which axially intersects the axis of said screw conveyor so as to be revolvably disposed around said shell; and a second screw conveyor axially intersecting said transition-box part at a point spaced apart from the first mentioned point of axial intersection, whereby the second screw conveyor has selectively variable discharge positions and a closure position spaced angularly apart relatively to said shell circumferential grain discharge.

3. Grain handling apparatus, comprising a container for threshed grain, said container having a substantially horizontal bottom and a side wall rising from said bottom to define an elongate dihedral angle extending along one lateral side of the container; a screw conveyor mounted within and extending along said dihedral angle; an elongate guide plate transversely curved and fitted into said dihedral angle, substantially concentrically with respect to the rotative axis of the screw conveyor, said guide plate having a tangential entry portion lying in the surface of said horizontal bottom so as to direct grain into the rotative path of the screw conveyor; a series of L-shaped inverted housing sections for the screw conveyor, said housing sections being mutually aligned longitudinally and configurated to close off the portions of the screw conveyor otherwise exposed to the interior of the container; means individually hinging the respective housing sections at one marginal edge thereof, to the said side wall of the container, so said sections may be selectively raised with respect to the defining walls of the container; and control means for enabling selective raising of the housing sections.

4. The combination recited in claim 3, wherein openings for the passage of grain are provided in the upper surfaces of the respective inverted L-shaped housings, and valve means are provided for the respective openings to control remotely from above the passage of grain therethrough.

5. The combination recited in claim 3, wherein the guide plate has its upper longitudinal margin bent inwardly of the container as an overhanging lip, and the hinge means for the housing sections are disposed under said lip.

6. Grain-handling apparatus, comprising a container for threshed grain, said container having a substantially horizontal bottom, opposite side walls, and an end wall having an opening for the discharge of grain; a conveyor positioned adjacent and extending along the juncture of said bottom with one of said side walls, said conveyor extending to said discharge opening; a series of inverted L-shaped housing sections for the conveyor, said housing sections being mutually aligned longitudinally to close off the portions of the conveyor exposed to the interior of the container; means individually hinging the marginal edge portion of one L-edge of the respective housing sections at the said side wall of the container, so said sections may be selectively raised to elevate the marginal edge portion of the other L-leg with respect to the defining bottom of the container; and control means for enabling selective raising of the housing sections.

7. The combination recited in claim 6, wherein openings for the passage of grain are provided in the upper surfaces of the respective housing sections, and valve means adjustable from above are provided for the respective openings to control the passage of grain therethrough in the various angular positions of said upper surfaces.

8. The combination recited in claim 7, wherein a cylindrical shell extends from the container, exteriorly thereof, at said discharge opening, forming a continuation of said opening, said shell having a discharge aperture located in the cylindrical surface of the shell; wherein a tubular boom is rotatably mounted concentrically with the cylindrical shell, extending transversely therefrom, said boom having an opening adapted for registry with said discharge aperture; and wherein a conveyor is operably mounted within and longitudinally of said boom.

9. Grain handling apparatus comprising a container having a tightly closed body that includes a substantially horizontal bottom and a substantially vertical wall intersecting said bottom; screw conveyor means rotatably disposed within the angular configuration between said bottom and said vertical wall; quarter-turn guide means substantially concentric with said screw conveyor means; said guide means being approximately tangent to both said bottom and said side walls and having a forwardly extending plane surface which coincides with the surface of said horizontal bottom; and means operative to rotate said conveyor means wherein is included sectional housing means, each section of which consists of a normally vertical plane in front of said screw conveyor; a normally horizontal plate extending over the top of the conveyor so as to join said vertical plate, thereby at least partially enclosing said screw conveyor means; hinge means connecting said housing means to said wall along the edge thereof opposite the joint between the two said plates; means for raising and lowering said sectional housing means; and a deflecting lip in proximity to the hinge axis, said lip being inclined to and along said wall so as to guide grain into the screw conveyor.

HENRY H. BAWDEN.
RULON E. JENKINS.

REFERENCES CITED

The following references are of record in the file of this patent:

UNITED STATES PATENTS

| Number | Name | Date |
|---|---|---|
| 174,617 | Caldwell | Mar. 14, 1876 |
| 652,285 | Musciacco | June 26, 1900 |
| 835,573 | Stewart et al. | Nov. 13, 1906 |
| 1,027,432 | Prinz | May 28, 1912 |
| 1,093,952 | Stephens | Apr. 12, 1914 |
| 2,298,332 | Applegate | Oct. 13, 1942 |
| 2,310,620 | Dye | Feb. 9, 1943 |
| 2,311,865 | Pilcher | Feb. 23, 1943 |
| 2,342,453 | Collucci | Feb. 22, 1944 |
| 2,390,286 | Adams | Dec. 4, 1945 |
| 2,421,418 | Grossman | June 3, 1947 |